US011205004B2

(12) United States Patent
Li et al.

(10) Patent No.: US 11,205,004 B2
(45) Date of Patent: Dec. 21, 2021

(54) VULNERABILITY DRIVEN HYBRID TEST SYSTEM FOR APPLICATION PROGRAMS

(71) Applicant: Baidu USA LLC, Sunnyvale, CA (US)

(72) Inventors: Peng Li, Sunnyvale, CA (US); Yulong Zhang, Sunnyvale, CA (US); Tao Wei, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 137 days.

(21) Appl. No.: 16/443,619

(22) Filed: Jun. 17, 2019

(65) Prior Publication Data

US 2020/0394311 A1    Dec. 17, 2020

(51) Int. Cl.
G06F 21/57    (2013.01)
G06F 11/36    (2006.01)
G06F 8/41    (2018.01)

(52) U.S. Cl.
CPC ............ G06F 21/577 (2013.01); G06F 8/433 (2013.01); G06F 11/3676 (2013.01); *G06F 2221/034* (2013.01)

(58) Field of Classification Search
CPC ..... G06F 21/577; G06F 8/433; G06F 11/3676
See application file for complete search history.

(56) References Cited

U.S. PATENT DOCUMENTS

2006/0010431 A1*  1/2006  Patil .......................... G06F 8/52
                                                                 717/131
2009/0133008 A1   5/2009  Patil et al.
2012/0054552 A1*  3/2012  Artzi ................... G06F 11/3684
                                                                 714/38.1

(Continued)

FOREIGN PATENT DOCUMENTS

JP    2006523898 A    10/2006
JP    2017520842 A    7/2017

(Continued)

OTHER PUBLICATIONS

Zhao et al "Send Hardest Problems My Way: Probabilistic Path Prioritization for Hybrid Fuzzing", Network and Distributed Systems Symposium Feb. 24-27, 2019 (Year: 2019).*

(Continued)

*Primary Examiner* — Noura Zoubair
(74) *Attorney, Agent, or Firm* — Womble Bond Dickinson (US) LLP (57) ABSTRACT

According to one embodiment, a system receives an intermediate result generated by a compiler based on source code, where the intermediate result includes one or more vulnerability indicators indicating one or more lines of the source code being potentially vulnerable. The system performs a grey box fuzzing on a first executable code generated from the intermediate result to generate a first set of seed inputs. The system calculates a vulnerability score for each of the seed inputs of the first set based on the vulnerability indicators for the lines of the source code reachable but has not been explored by the grey box fuzzing. The system selects one of the seed inputs in the first set having a highest vulnerability score. The system performs a concolic execution using the selected seed input as priority, the concolic execution being performed on a second executable code generated from the intermediate result.

17 Claims, 8 Drawing Sheets

(56) References Cited

U.S. PATENT DOCUMENTS

2012/0317647 A1    12/2012  Brumley et al.
2019/0384697 A1*  12/2019  Phan .................. G06F 11/3676

FOREIGN PATENT DOCUMENTS

WO        2004095176 A2    11/2004
WO        2015191731 A1    12/2015

OTHER PUBLICATIONS

Kexiong (Curtis) Zeng et al: "All Your GPS Are Belong to Us: Towards Stealthy Manipulation of Road Navigation Systems", USENIX, USENIX, The Advanced Computing Systems Association Aug. 14, 2018 (Aug. 14, 2018), pp. 1540-1557.
Sakiz Fatih et al: A survey of attacks and detection mechanisms on intelligent transportation systems: VANETs and IoV, Ad Hoc Networks, Elsevier, Amsterdam, NL, vol. 61, Mar. 18, 2017 (Mar. 18, 2017), pp. 33-50.
Pendleton Scott et al: "Autonomous golf cars for public trial of mobility-on-demand service", 2015 IEEE/RSJ International Conference on Intelligent Robots and Systems (IROS), IEEE, Sep. 28, 2015 (Sep. 28, 2015), pp. 1164-1171.
Ognawala et al., "Compositional Fuzzing Aided by Targeted Symbolic Execution", Mar. 7, 2019, 29 pages.

* cited by examiner

Source Code

```
#include <stdio.h>
include <stdlib.h> int main(void) {
    int a = 0;
    int b = a + 1;
    int c = a+b;
    printf("c: %d \n", c);
    return 0;
}
```

301

Compiler Injected Vulnerability Code for {int c = a+b;}

```
br i1 %4, label %cont, label %handler.add_overflow, !prof !2,
!nosanitize !1, !afl_edge_sanitizer !1 handler.add_overflow:                  ; preds = %entry
  %5 = zext i32 %0 to i64, !nosanitize !1
  call void @__ubsan_handle_add_overflow(i8* bitcast ({ { [7 x i8]*,
i32, i32 }, { i16, i16, [6 x i8] } }* @1 to i8*), i64 %5, i64 1) #4,
!nosanitize !1
  br label %cont, !nosanitize !1 cont:                                  ; preds = %handler.add_overflow,
%entry
  store i32 %2, i32* %b, align 4
```

VULNERABILITY DRIVEN HYBRID TEST SYSTEM FOR APPLICATION PROGRAMS

TECHNICAL FIELD

Embodiments of the invention relate generally to secure multiparty computing. More particularly, embodiments of the invention relate to a vulnerability driven test system for application programs.

BACKGROUND

Hybrid fuzz testing leverages both fuzz testing (or fuzzing) and concolic execution to improve code coverage over either one of the approaches alone, however, the code coverage-centric design is inefficient in vulnerability detection as it may blindly explore a code space which may not contain any vulnerabilities. In addition, the coverage-centric hybrid testing quickly moves on after reaching a chunk of code, rather than examining for hidden defects within a chunk of code. Frequently, the coverage-centric hybrid fuzz testing may miss exploitable vulnerabilities despite the fact that it has already explored code paths surrounding the vulnerabilities.

Current coverage-centric hybrid testing methods include Driller: augmenting fuzzing through selective symbolic execution, QSYM: A practical concolic execution engine tailored for hybrid fuzzing; and probabilistic path prioritization for hybrid fuzzing. These coverage-centric hybrid fuzzing methods all suffer from the problems mentioned above.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure disclose methods and systems to evaluating vulnerabilities of a program code. According to one embodiment, a system receives an intermediate result generated by a compiler based on source code, where the intermediate result includes one or more vulnerability indicators indicating one or more lines of the source code being potentially vulnerable. The system performs a grey-box fuzzing process on a first executable code generated from the intermediate result to generate a first set of seed inputs. The system calculates a vulnerability score for each of the seed inputs of the first set based on the number of vulnerability indicators for the source code regions reachable but has not been explored by the grey box fuzzing process. The system selects one of the seed inputs in the first set having a highest vulnerability score. The system performs a concolic execution using the selected seed input as priority, where the concolic execution is being performed on a second executable code generated from the intermediate result.

Figure 1:
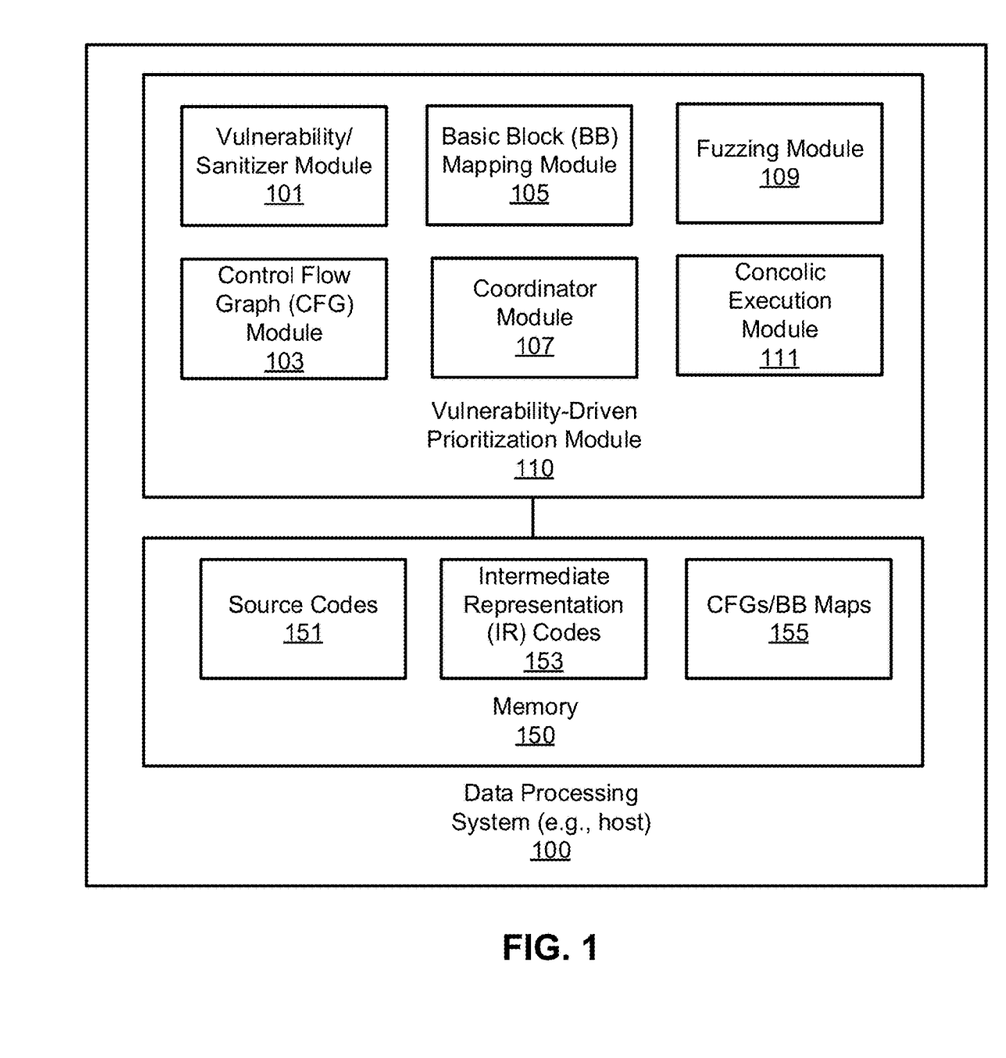
FIG. 1 is a block diagram illustrating a host system according to one embodiment.

FIG. 1 is a block diagram illustrating a data processing system according to one embodiment. Referring to FIG. 1, data processing system (e.g., host) 100 may be any kind of computing system, including a server or a cluster of servers, such as Web or cloud servers, application servers, backend servers, or a combination thereof. In another embodiments, system 100 may be any type of devices such as a personal computer (e.g., desktops, laptops, and tablets), a "thin" client, a personal digital assistant (PDA), a Web enabled appliance, a Smartwatch, or a mobile phone (e.g., Smartphone), etc. System 100 can include an interface to allow a client to access resources or services provided by system 100. Examples of services can include bug/vulnerability analysis, fuzz testing, colic execution, and prioritized hybrid fuzz testing services for software program application source codes. The services can be performed using vulnerability-driven prioritization module 110. System 100 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

Vulnerability-driven prioritization module 110 can include vulnerability/sanitizer module 101, basic block (BB) mapping module 105, control flow graph module 103, coordinator module 107, fuzzing module 109, and concolic execution module 111. Vulnerability/sanitizer module 101 can be a tool that identifies potential vulnerabilities within a source code of a software program. These vulnerabilities can include memory corruption, data mismatch, thread related bugs/vulnerabilities, etc. In one embodiment, module 101 performs vulnerability labeling through a compiler's frontend or backend, such as Undefined Behavior Sanitizer for compiler Clang. In another embodiment, module 101 is a standalone analyzer that can analyze code regions that contain the potential vulnerabilities and identify the number of vulnerability labels. In another embodiment, the source code can be transformed into intermediate representation (IR) as an intermediate result for code analysis.

Control flow graph (CFG) module 103 can identify and map a graph of different paths or control flows from one basic block (BB) to another for a software program. Here a basic block or BB refers to a unit of code that contains one or more lines of code or blocks of code within a software program. The graph mapping can be a tree graph, stored as one or more tuples describing one or more branches connecting the BBs together. For a given software application program, module 103 builds one or more intraprocedural CFGs for each of functions/procedures within the software program and then module 103 bridges the intraprocedural (or function-level) CFGs by the caller-callee relations to the functions to build an inter-procedural CFG for the software program. To resolve indirect calls to a function (such as through pointers), module 103 can perform Andersen's point-to analysis on pointers within the application program and to expand functions of any calls if the pointers point to function calls. Andersen's points-to analysis is a static code analysis that analyzes which pointers, or heap references, point to which variables. Pointers analysis can include analysis for four instruction types, for example, addressing of a variable, dereferencing of a pointer, copying of a pointer from one variable to another, and assigning through a pointer. In another embodiment, module 103 can also apply Andersen's point-to analysis to code with dynamic memory allocation, e.g., code associated with malloc or new memory operations.

Basic block (BB) mapping module 105 can map each BB within a software program to a number of potential vulnerabilities associated to the BB. The mapping can be stored as one or more tuples for BBs and their associated count of potential vulnerabilities reachable by the BBs. Coordinator module 107 can coordinate one or more grey box fuzzing and/or concolic executions. Fuzzing module 109 can perform a fuzzing (e.g., black box, grey box, or white box fuzzing) for a software application program to generate one or more seed inputs. Concolic execution module 110 can perform a concolic execution for a software application program based on one or more seed inputs. Note, grey box fuzzing refers to a coverage guided fuzzing, thus, grey box fuzzing can prioritize randomized generation of seed inputs that explore new control paths of an application program. Examples of randomized generations include mutations for seed inputs, such as swap bytes, reverse bits of the seed inputs, etc. Note, vulnerabilities reachable by a BB refer to potential vulnerabilities/bugs within a control flow of the BB.

In one embodiment, vulnerability-driven prioritization module 110 may receive an application program source code from a client for analysis. The source code may be stored in memory 150 as part of source code 151. Intermediate representations (IR) (e.g., intermediate results) of the source code can be generated by a compiler (as part of IR codes 153). CFG module 103 and BB mapping module 105 then analyze the IR to generate BB mappings and CFGs from the IR code and store them as part of CFG/BB maps 155 for vulnerabilities analysis.

Figure 2:
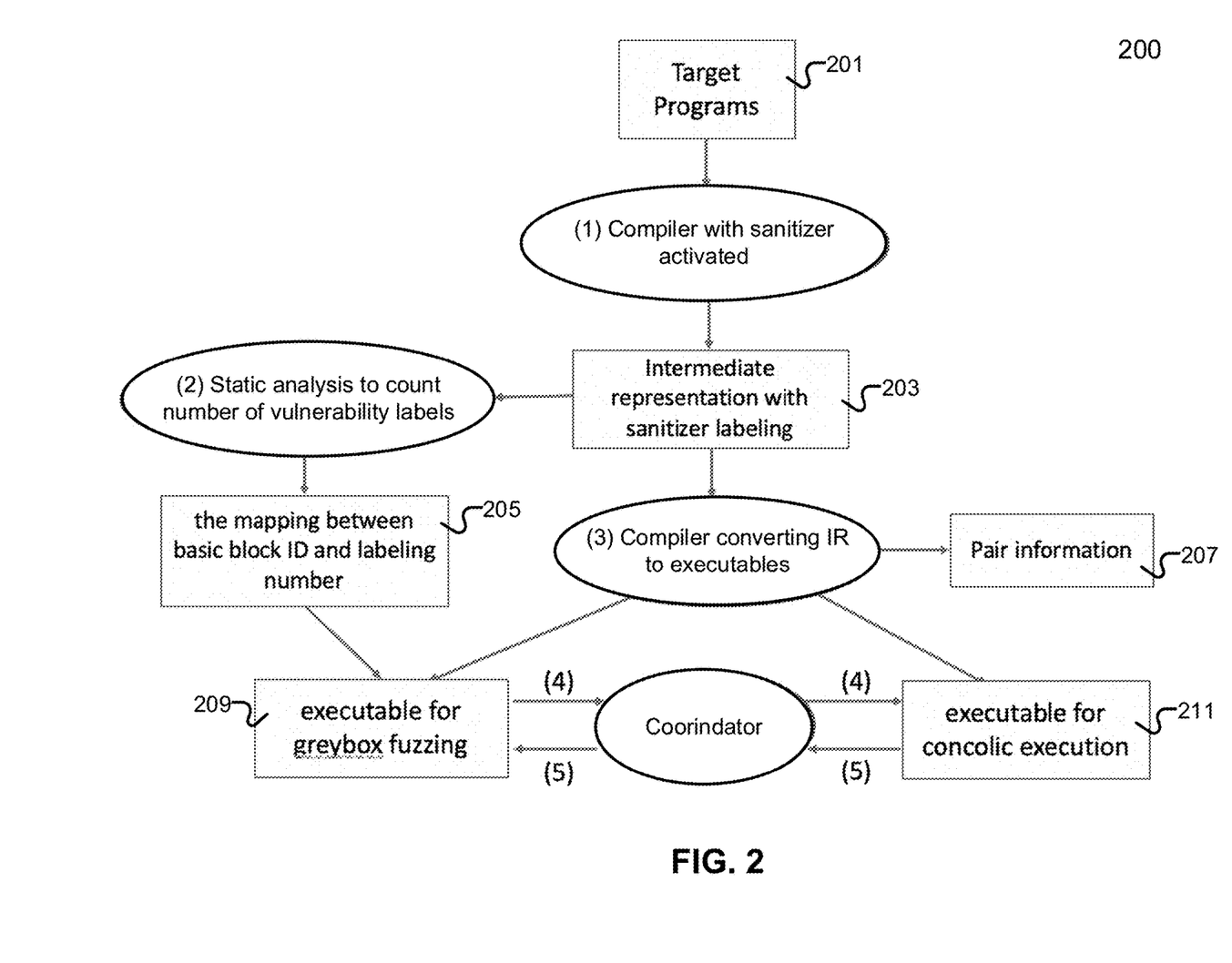
FIG. 2 is a block diagram illustrating an example of a flow chart for a vulnerability driven hybrid fuzz test method according to one embodiment.

FIG. 2 is a block diagram illustrating an example of a flow chart for a vulnerability driven hybrid fuzz test method according to one embodiment. Flow chart 200 illustrates the operations for a prioritized hybrid fuzzing with concolic executions for software program(s). Flow chart 200 may be performed by processing logic which may include software, hardware, or a combination thereof. In one embodiment, flow chart is performed by system 100 of FIG. 1. Referring to FIG. 2, processing logic receives target program(s) 201. Target program(s) 201 can be source codes in any programmable languages (C, C++, java, python, objective-C, JavaScript, etc.). At operation 1, a compiler with a sanitizer module generates an intermediate representation (e.g., IR code) with sanitizer labels 203 from the source code of the target programs. The sanitizer module generates one or more sanitizer labels corresponding to one or more compiler injected sanitizer codes representing one or more potential vulnerabilities (e.g., sanitizer/vulnerability labels) in the source code. Note an intermediate representation (IR) refers to a data structure or code used internally by a compiler or virtual machine to represent source code.

Referring to FIG. 2, once the IR code 203 is generated, at operation 2, a static analysis is performed for the IR code 203 to count the number of vulnerability labels within each BB in IR code 203. Processing logic can further label each BB with a BB identifier (ID) and generate a mapping for the BB ID to the number of vulnerability labels within (or reachable by) the BB. Note that a BB refers to a source line sequence with no branches-in except to the entry and no branches-out except at the exit. The basic blocks can form vertices or nodes in a control flow graph (CFG). A CFG refers to a representation, using graph notation, of all paths that might be traversed through an application program during its execution.

Referring to FIG. 2, at operation 3, IR 203 can be compiled into two executables 209-211, a first executable 209 to be used for grey box fuzzing, and a second executable 211 to be used for concolic execution. Here, only two executables are illustrated, however, more than two executables can be generated so that multiple fuzzing and/or concolic executions can be executed concurrently. In one embodiment, BB pairing information 207 can be generated. The BB pairing information 207 can represent a CFG of a target program for priority analysis. The BB pairing information can include one or more mapping tuples, mapping BBs to their edges (or branches) by IDs in a parent-child relationship. Edges correspond to branches of child BBs of the BB being mapped.

Referring to FIG. 2, in one embodiment, a fuzzing iteration is performed on a first compiled executable to generate a first set of seed inputs. Fuzzing or fuzz testing refers to an automated software application program testing technique that generates invalid, unexpected, or random data as seed inputs to a computer program. In one embodiment, fuzzing can monitor for thrown exceptions (e.g., catch/try) for the program. A fuzzer can be a black box, grey box, or white box fuzzer. A black box fuzzer treats an application program as a black box and the fuzzer is unaware of an internal structure of the program. A white box fuzzer has access to an internal structure of the program and can systematically explore different paths in the program based on the access, however, at a high cost of execution time because it takes a long time for analysis. Grey box fuzzers can utilize instrumentation to gather information about a structure of the program. For example, a grey box fuzzer can utilize a tracer to trace basic block transitions/branching for a seed input, thus, can indicate whether there are new branches in the source code being explored. Note that instrumentation refers to the ability to monitor or measure a level of performance, diagnose errors, and/or access trace information of an application program.

In one embodiment, fuzzing generates the seed inputs randomly. In another embodiment, fuzzing generates the seed inputs mutating existing seed inputs. A user configuration for fuzzing may select whether to generate seed inputs randomly or to modify existing seed inputs to generate additional seed inputs.

Once an iteration of the fuzzing completes and the first set of seed inputs are generated, at operation 4, a coordinator calculates a vulnerability score for each of the seed inputs of the first set. The vulnerability score can be a count of vulnerability labels of branches that is reachable but has not been explored by the fuzzer for the seed inputs. In one embodiment, the vulnerability scores for the seed inputs are sorted in order and the seed input with a higher vulnerability score is prioritized as an input to a concolic execution. Here, a concolic execution can be executed by a second compiled executable. In another embodiment, more than one concolic execution can be executed concurrently. Note that concolic execution or concolic testing refers to testing by symbolic execution through instrumentation, a technique that treats program variables as symbolic variables, along a particular execution path. Note here concolic execution can be executed for the reachable but unexplored paths for the first set of seed inputs. Based on the one or more concolic executions, a second set of seed inputs can be determined in a vulnerability driven (or prioritized) manner. Here, a priority is given to seed inputs that have a high count of unexplored potentially vulnerabilities within their reach.

Referring to FIG. 2, at operation 5, the second set of seed inputs are merged with the first set of seed inputs and coordinator coordinates fuzzing to be performed in a second iteration to generate a third set of seed inputs (which are unique from the first and the second sets). The output is then provided as inputs to one or more concolic executions to generate a fourth set of seed inputs. The iterations can be repeated until a predetermined time has elapsed or until the iterations reaches a vulnerabilities percentage and/or count. In one embodiment, coordinator keeps track of all the seed inputs. In another embodiment, coordinator discards seed inputs which do not uncover new vulnerabilities and/or branches and only keeps seed inputs which explores unique branches and/or vulnerabilities.

Figure 3:
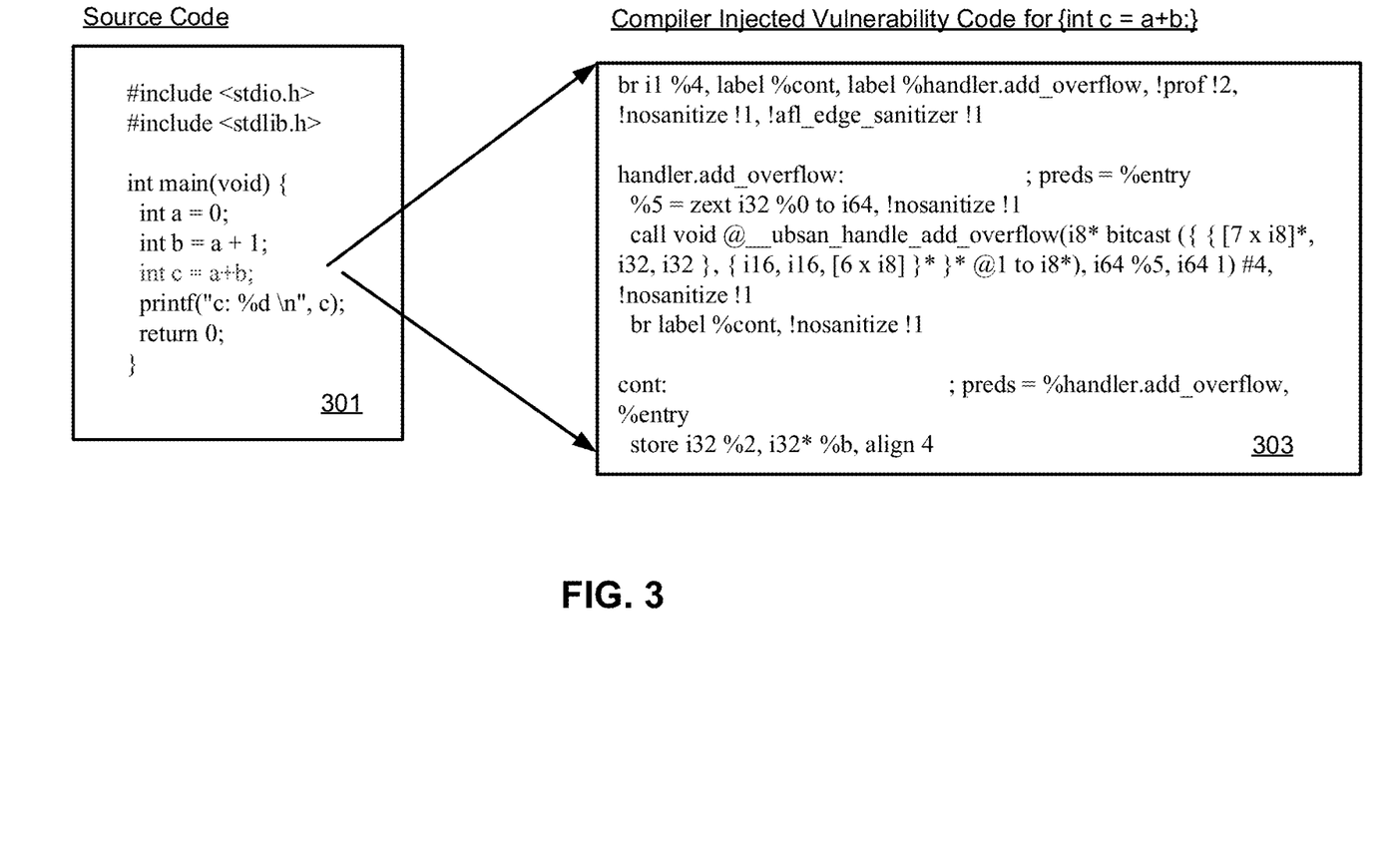
FIG. 3 is a block diagram illustrating a compiler injected code for a potential vulnerability according to one embodiment.

FIG. 3 is a block diagram illustrating a compiler injected code for a potential vulnerability according to one embodiment. Referring to FIG. 3, a c++ source code 301 is shown that prints an output for the operations of c=a+b. A compiler with a sanitizer can generate IR code 303 for the line of code "int c=a+b;" for source code 303. Here, IR code 303 is a handler to catch an integer overflow error, e.g., a potential vulnerability, for code "int c=a+b". An integer overflow error can occur when the result of an arithmetic operation is not representable in the range of the result type. This can occur when a result of the operation a+b goes beyond [INT_MIN, INT_MAX].

Figure 4:
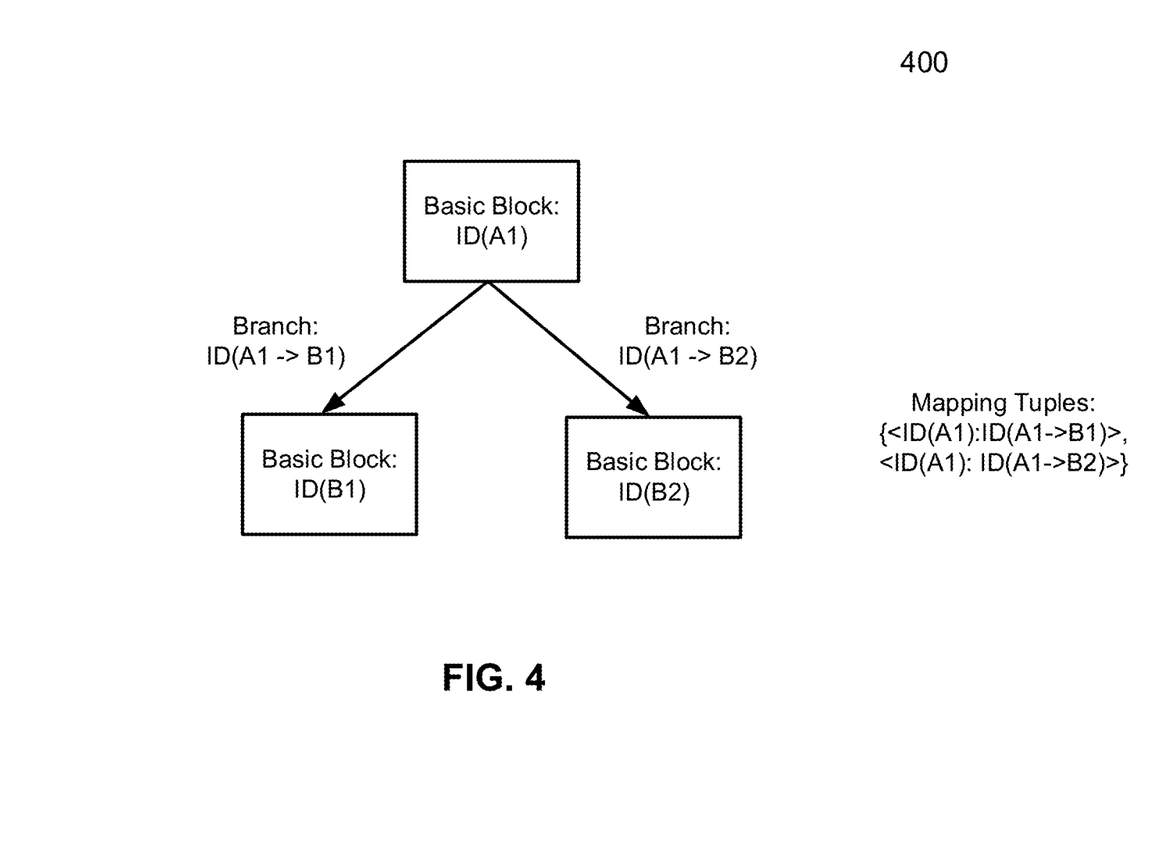
FIG. 4 is an example of a control flow graph and corresponding mapping tuples for an application program according to one embodiment.

FIG. 4 illustrates an example of a control flow graph (CFG) and corresponding mapping tuples for an application program according to one embodiment. Referring to FIG. 4, CFG 400 can include three basic blocks with IDs: ID(A1), ID(B1), and ID(B2), and two branches with IDs: ID(A1→B1) for branch A1 to B1, and ID(A1→B2) for branch A1 to B2. Based on CFG 400, the pairing information or mapping tuples can be generated to be: {<ID(A1):ID (A1→B1)>, <ID(A1): ID(A1→B2)>}.

Figure 5:
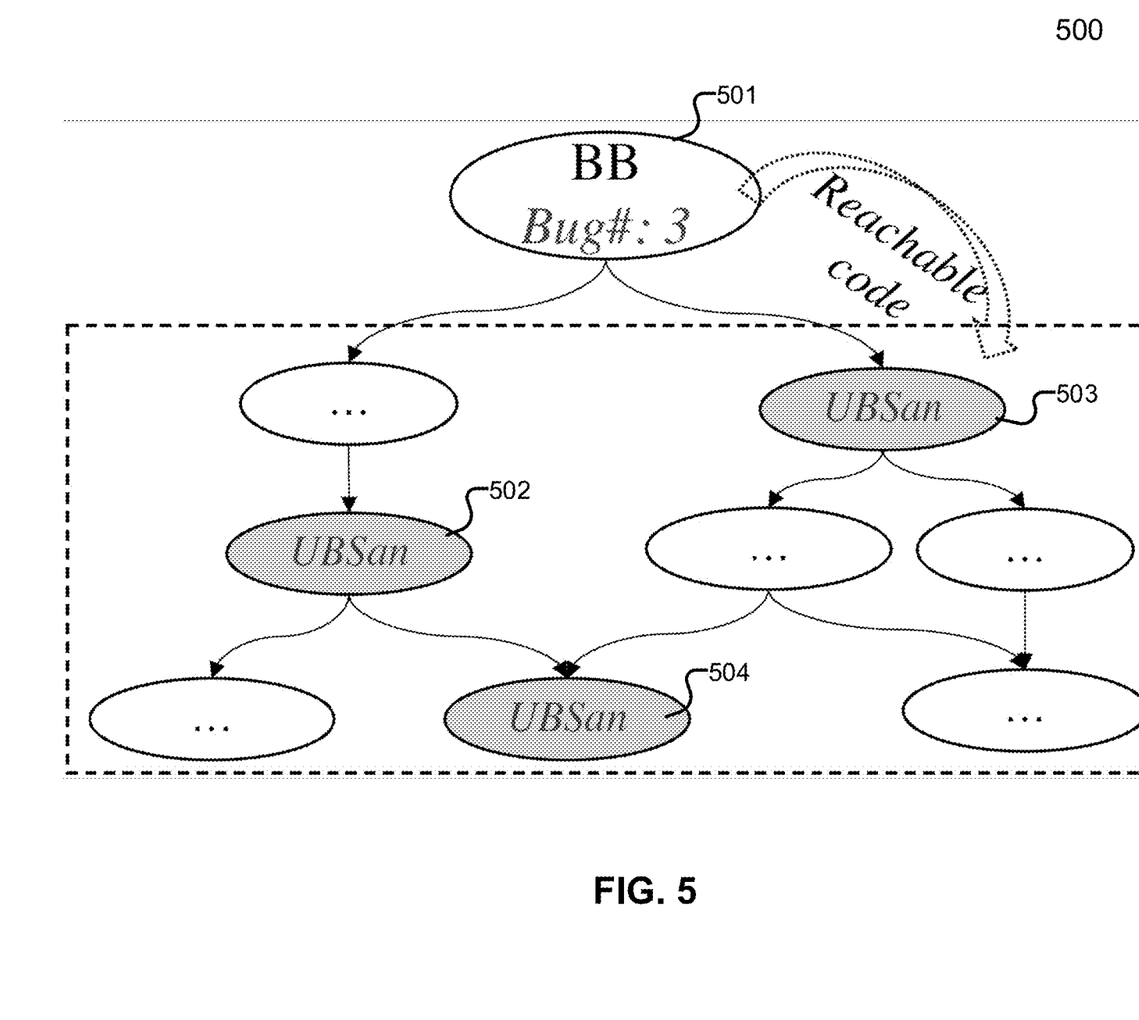
FIG. 5 is an example of a basic block mapping with reachable vulnerabilities according to one embodiment.

FIG. 5 is an example of a basic block with reachable vulnerabilities according to one embodiment. Referring to FIG. 5, CFG 500 illustrates a number of vulnerability labels that can be forwardly reached by a BB. Here, undefined behavior sanitizer (UBSan) for Clang is used to generate the IR potential vulnerability code blocks. Referring to FIG. 5, BB 501 includes eight child BBs, of which, three BBs contain UBSan (or potential vulnerabilities), e.g., BBs 502-504. Thus, BB 501 has a count of three for the number of potential vulnerabilities reachable by BB 501. The BB mapping from BB 501 to the vulnerability labeling number can then be: <ID(BB):number>, e.g., <501:3>. The BB mapping can be used by a coordinator module to prioritize concolic executions for seed inputs corresponding to the BB.

Figure 6:
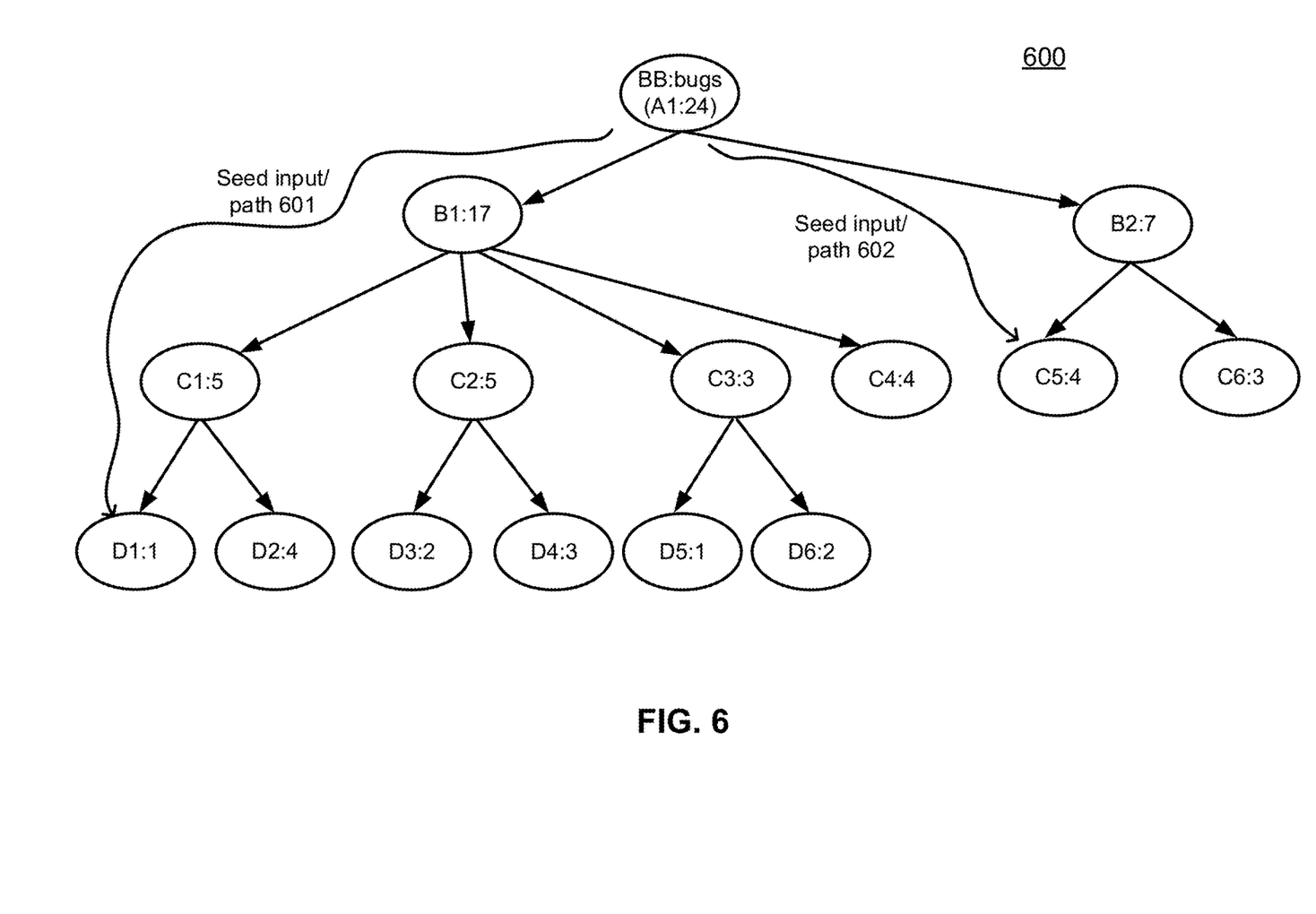
FIG. 6 is an example of a vulnerability score computation for a scenario according to one embodiment.

FIG. 6 is an example of a vulnerability score computation for a scenario according to one embodiment. The computation of FIG. 6 can be performed by a coordinator module, such as coordinator module 107 of FIG. 1. Referring to FIG. 6, in one embodiment, a coordinator may have initiated a first iteration of vulnerability driven hybrid grey box fuzzing and concolic execution. In this scenario, the fuzzing iteration may have been performed by an executable of an application program having CFG 600 and may have generated seed inputs 601-602. Here, seed inputs 601-602 can correspond to paths reaching BB D1 and BB C5, respectively. The seed input generation may have been randomized or mutated by switching bytes or flipping bits. Next, a vulnerability score is calculated for each of seed inputs 601 and 602 to prioritize the seed with higher score for a concolic execution to maximize vulnerability/bug coverage.

Referring to FIG. 6, CFG 600 can represent a control flow graph (as previously described) for an application program. More specifically, CFG 600 includes one or more BBs in a tree hierarchy, where each BB indicates a number of vulnerabilities or bugs reachable by each BB. For example, BB A1 (denoted by A1:24) can indicate a main node A1 has 24 reachable potential vulnerabilities.

In one embodiment, a vulnerability score computation is calculated based on the number of reachable but unexplored BBs corresponding to the BB of the seed input. For example, seed input or path 601 corresponds to a path from A1 to D1. Here, the explored BBs of path 601 include A1, B1, C1, and D1. The unexplored BBs to path 601 include D2, C2, C3, and C4. Based on the unexplored BBs, in one embodiment, the vulnerability score can be calculated by averaging a total number of reachable but unexplored potential bugs over a count of the number of reachable but unexplored BBs, e.g., score of path 601=¼(4+5+3+4)=4. In another embodiment, the vulnerability score can be calculated based on a solving attempts counter for a weighted averaging.

For seed input or path 602, which corresponds to a path from A1 to C5, the explored BBs for path 602 include A1, B2, and C5. The unexplored BBs for path 602 include C6. Based on the unexplored BBs, the vulnerability score can be calculated by averaging a total number of reachable but unexplored potential bugs over a count of the number of reachable but unexplored BBs, e.g., score for path 602=3, the reachable vulnerabilities/bugs for BB C6. Based on the calculated vulnerability scores of paths 601-602, coordinator is to select a seed input with a highest vulnerability score, e.g., path 601 with a score of 4, as the seed input for a concolic execution. Here, the concolic execution is to receive seed input 601 as a seed input. Concolic execution then replays seed input 601 and performs concolic execution to explore branch conditions to determine the seed inputs for the immediate reachable but unexplored BBs of path 601, e.g., concolic execution determines the seed inputs that can reach BBs: D2, C2, C3, and C4. After a concolic execution for path 601 is performed, coordinator is to determine the next seed input with the highest vulnerability score, e.g., seed input 602. Concolic execution is then to be performed using seed input 602 since seed input 602 has the next highest vulnerability score, a score of 3. Concolic execution is then performed to determine the seed inputs for any immediate reachable but unexplored paths corresponding to path 602, e.g., concolic execution determines the seed input that can reach BB C6. After concolic execution is performed for the available fuzzing seed inputs, in one embodiment, the concolic execution generated seed inputs are fed back to a fuzzer for a rerun. The fuzzer can then either retain or discard the seed inputs depending on whether each of the seed inputs improves bug coverage. In another embodiment, a solving attempts counter can be increased for branches which are uncovered. As such, a branch having a much higher solving attempt value will be de-prioritized since it has been explored. In one embodiment, a coordinator monitors the generated seed inputs, and initiates another iteration of fuzzing and prioritized concolic execution. In another embodiment, the fuzzing and prioritized concolic executions can be iterated until a predetermined time or iterations have occurred. In another embodiment, the fuzzing and prioritized concolic executions can be iterated until a predetermined percentage of bug coverage is achieved.

Note that the vulnerability scores is used to prioritize seed inputs that can lead to more unverified bugs, while in the long run it should not be trapped in any hard-to-solve branch conditions.

Figure 7:
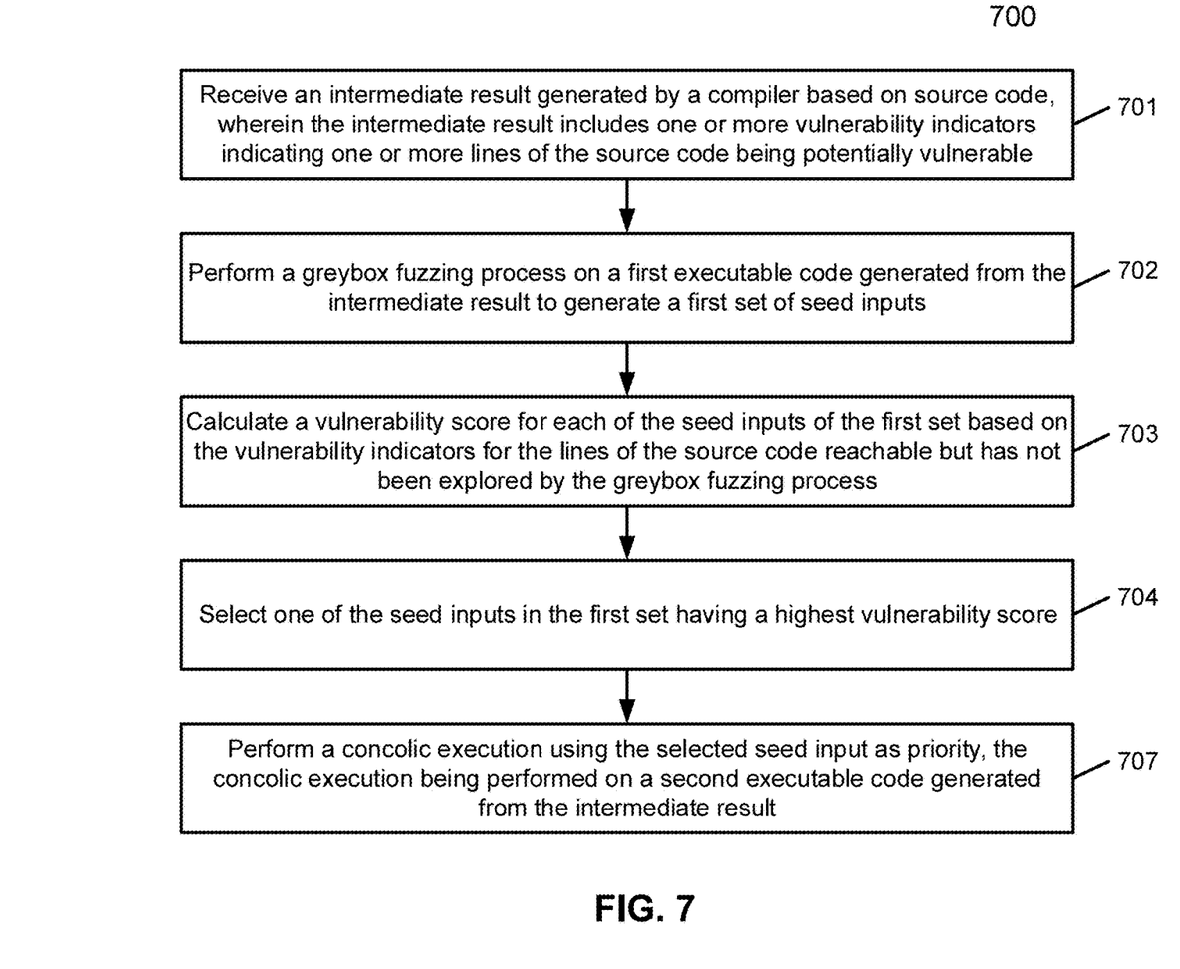
FIG. 7 is a flow diagram illustrating a method according to one embodiment.

FIG. 7 is a flow diagram illustrating a method according to one embodiment. Process 700 may be performed by processing logic which may include software, hardware, or a combination thereof. For example, process 700 may be performed by data processing system 100 of FIG. 1. Referring to FIG. 7, at block 701, processing logic receives an intermediate result (e.g., intermediate representation with compiler injected vulnerability codes) generated by a compiler based on source code, wherein the intermediate result includes one or more vulnerability indicators indicating one or more lines of the source code being potentially vulnerable. At block 702, processing logic performs a grey box fuzzing process on a first executable code generated from the intermediate result to generate a first set of seed inputs. At block 703, processing logic calculates a vulnerability score for each of the seed inputs of the first set based on the vulnerability indicators for the lines of the source code reachable but has not been explored by the grey box fuzzing process. At block 704, processing logic selects one of the seed inputs in the first set having a highest vulnerability score. At block 705, processing logic performs a concolic execution using the selected seed input as priority, the concolic execution being performed on a second executable code generated from the intermediate result.

In one embodiment, the concolic executions generate a second set of seed inputs that caused a program flow control of the concolic execution to explore one or more branches of the source code not explored by the grey box fuzzing process. In another embodiment, processing logic further adds the second set of seed inputs to the first set of seed inputs, such that the one or more seed inputs of the second set are utilized by the grey box fuzzing process during a next iteration.

In one embodiment, calculating a vulnerability score for each of the seed inputs of the first set includes identifying a program control flow that has been explored by the grey box fuzzing process corresponding to the seed input, and calculating the vulnerability score for the seed input based on a number of vulnerability indicators reachable by the program control flow but that has not been explored by the grey box fuzzing process. In one embodiment, selecting one of the seed inputs in the first set having a highest vulnerability score comprises ordering the seed inputs of the first set based on their respective vulnerability scores to prioritize concolic executions for the first set of seed inputs.

In one embodiment, processing logic further identifies a plurality of basic blocks of code from the intermediate result. For each of the basic blocks, processing logic further determines a number of vulnerability indicators within the basic block, and generates a mapping table that maps a block identifier (ID) of each basic block to a number of vulnerability indicators associated with the basic block, wherein the mapping table is utilized to calculate a vulnerability score. In another embodiment, calculating a vulnerability score for each of the seed inputs of the first set includes building a program control flow graph (CFG) based on a program control flow of the intermediate result corresponding to the seed input, and summing the number of vulnerability indicators of all basic blocks reachable but unexplored by the program CFG to represent the vulnerability score for the seed input, wherein the summing comprises performing a lookup operation in the mapping table to determine a number of vulnerability indicators associated with the basic block. In one embodiment, the at least one of the vulnerability indicator includes an exception throw and catch (throw/catch) block inserted by the compiler, which when an associated line of source code violates a safety rule during execution, an exception is thrown and caught by an operating system.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
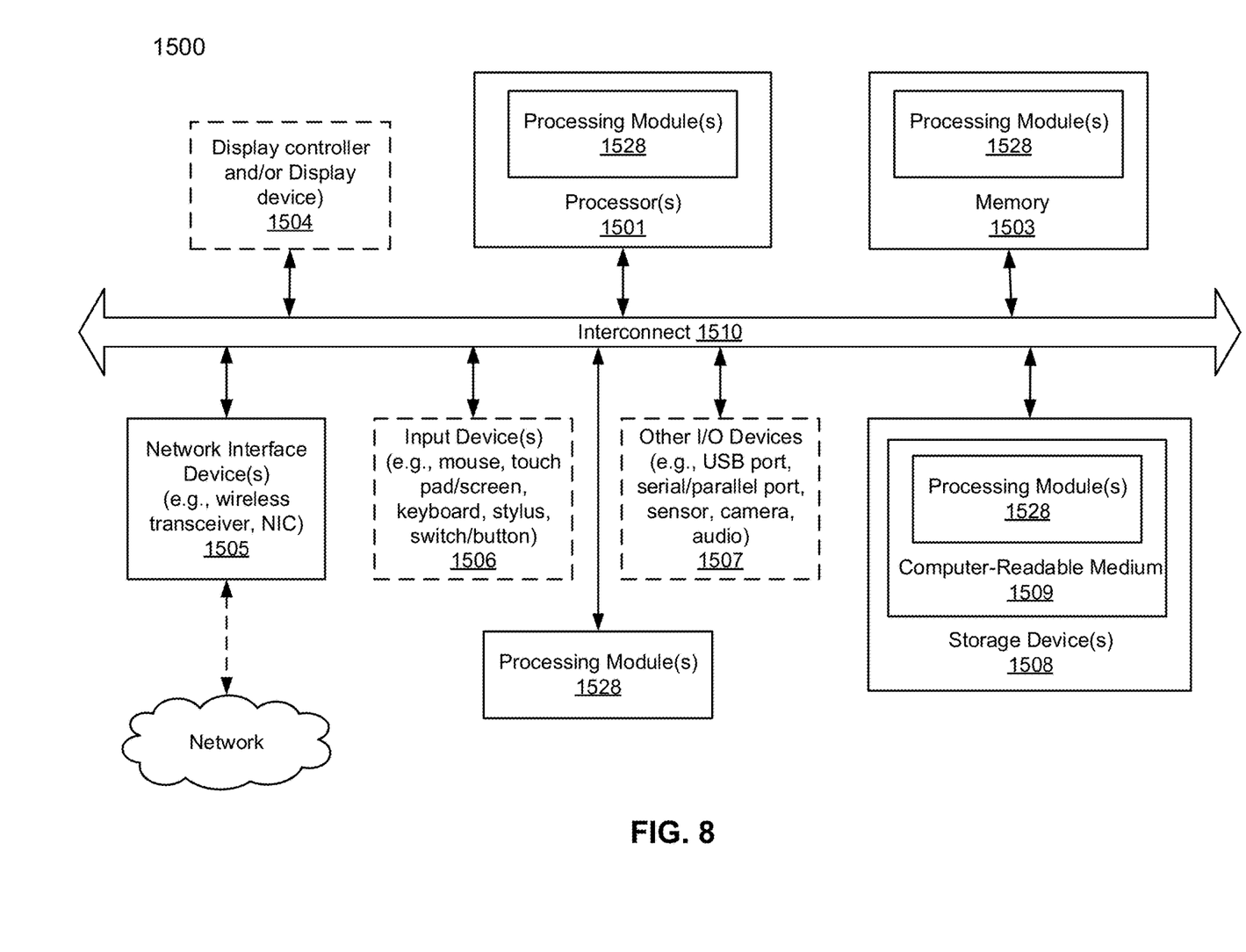
FIG. 8 is a block diagram illustrating a data processing system according to one embodiment.

FIG. 8 is a block diagram illustrating an example of a data processing system which may be used with one embodiment of the invention. For example, system 1500 may represent any of data processing systems described above performing any of the processes or methods described above, such as, for example, a client device or a server described above, such as, for example, system 101, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, vulnerability-driven prioritization module 110 or system 100 of FIG. 1. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for evaluating vulnerability of program code, the method comprising:
   receiving an intermediate result generated by a compiler based on source code, wherein the intermediate result includes one or more vulnerability indicators indicating one or more lines of the source code being potentially vulnerable;
   performing a grey box fuzzing process on a first executable code generated from the intermediate result to generate a first set of seed inputs;
   calculating a vulnerability score for each of the seed inputs of the first set based on the one or more vulnerability indicators for the lines of the source code reachable but has not been explored by the grey box fuzzing process, wherein at least one of the one or more vulnerability indicators comprises an exception throw and catch (throw/catch) block inserted by the compiler, which when an associated line of source code violates a safety rule during execution, an exception is thrown and caught by an operating system;
   identifying a plurality of basic blocks of code from the intermediate result for each of the basic blocks, determining a number of vulnerability indicators within the basic block;
   generating a mapping table that maps a block identifier (ID) of each basic block to the number of vulnerability indicators associated with the basic block, wherein the mapping table is utilized to calculate the vulnerability scores;
   selecting one of the seed inputs in the first set having a highest vulnerability score; and
   performing a concolic execution using the selected seed input as a priority, the concolic execution being performed on a second executable code generated from the intermediate result to generate a second set of seed inputs.

2. The method of claim 1, wherein the concolic executions generate the second set of seed inputs from seed inputs that caused a program flow control of the concolic execution to explore one or more branches of the source code not explored by the grey box fuzzing process.

3. The method of claim 2, further comprising adding the second set of seed inputs to the first set of seed inputs, such that one or more seed inputs of the second set are utilized by the grey box fuzzing process during a next iteration.

4. The method of claim 1, wherein calculating the vulnerability score for each of the seed inputs of the first set comprises:
   identifying a program control flow that has been explored by the grey box fuzzing process corresponding to the seed input; and
   calculating the vulnerability score for the seed input based on a number of vulnerability indicators reachable by the program control flow but that have not been explored by the grey box fuzzing process.

5. The method of claim 1, wherein selecting one of the seed inputs in the first set having a highest vulnerability score comprises ordering the seed inputs of the first set based on their respective vulnerability scores to prioritize concolic executions for the first set of seed inputs.

6. The method of claim 1, wherein calculating the vulnerability score for each of the seed inputs of the first set comprises:
   building a program control flow graph (CFG) based on a program control flow of the intermediate result corresponding to the seed input; and
   summing the number of vulnerability indicators of all basic blocks reachable but unexplored by the program CFG to represent the vulnerability score for the seed input, wherein the summing comprises performing a lookup operation in the mapping table to determine a number of vulnerability indicators associated with the basic block.

7. A non-transitory machine-readable medium having instructions stored therein, which when executed by a processor, cause the processor to perform operations, the operations comprising:
   receiving an intermediate result generated by a compiler based on source code, wherein the intermediate result includes one or more vulnerability indicators indicating one or more lines of the source code being potentially vulnerable;
   performing a grey box fuzzing process on a first executable code generated from the intermediate result to generate a first set of seed inputs;
   calculating a vulnerability score for each of the seed inputs of the first set based on the one or more vulnerability indicators for the lines of the source code reachable but has not been explored by the grey box fuzzing process, wherein at least one of the one or more vulnerability indicators comprises an exception throw and catch (throw/catch) block inserted by the compiler, which when an associated line of source code violates a safety rule during execution, an exception is thrown and caught by an operating system;
   identifying a plurality of basic blocks of code from the intermediate result for each of the basic blocks, determining a number of vulnerability indicators within the basic block;
   generating a mapping table that maps a block identifier (ID) of each basic block to the number of vulnerability indicators associated with the basic block, wherein the mapping table is utilized to calculate the vulnerability scores;
   selecting one of the seed inputs in the first set having a highest vulnerability score; and
   performing a concolic execution using the selected seed input as a priority, the concolic execution being performed on a second executable code generated from the intermediate result to generate a second set of seed inputs.

8. The non-transitory machine-readable medium of claim 7, wherein the concolic executions generate the second set of seed inputs from seed inputs that caused a program flow control of the concolic execution to explore one or more branches of the source code not explored by the grey box fuzzing process.

9. The non-transitory machine-readable medium of claim 8, wherein the operations further comprise adding the second set of seed inputs to the first set of seed inputs, such that one or more seed inputs of the second set are utilized by the grey box fuzzing process during a next iteration.

10. The non-transitory machine-readable medium of claim 7, wherein calculating the vulnerability score for each of the seed inputs of the first set comprises:
    identifying a program control flow that has been explored by the grey box fuzzing process corresponding to the seed input; and
    calculating the vulnerability score for the seed input based on a number of vulnerability indicators reachable by the program control flow but that have not been explored by the grey box fuzzing process.

11. The non-transitory machine-readable medium of claim 7, wherein selecting one of the seed inputs in the first set having a highest vulnerability score comprises ordering the seed inputs of the first set based on their respective vulnerability scores to prioritize concolic executions for the first set of seed inputs.

12. The non-transitory machine-readable medium of claim 7, wherein calculating the vulnerability score for each of the seed inputs of the first set comprises:
    building a program control flow graph (CFG) based on a program control flow of the intermediate result corresponding to the seed input; and
    summing the number of vulnerability indicators of all basic blocks reachable but unexplored by the program CFG to represent the vulnerability score for the seed input, wherein the summing comprises performing a lookup operation in the mapping table to determine a number of vulnerability indicators associated with the basic block.

13. A data processing system, comprising:
    a processor; and
    a memory coupled to the processor to store instructions, which when executed by the processor, cause the processor to perform operations, the operations including
       receiving an intermediate result generated by a compiler based on source code, wherein the intermediate result includes one or more vulnerability indicators indicating one or more lines of the source code being potentially vulnerable;
       performing a grey box fuzzing process on a first executable code generated from the intermediate result to generate a first set of seed inputs;
       calculating a vulnerability score for each of the seed inputs of the first set based on the one or more vulnerability indicators for the lines of the source code reachable but has not been explored by the grey box fizzing process, wherein at least one of the one or more vulnerability indicators comprises an exception throw and catch (throw/catch) block inserted by the compiler, which when an associated line of source code violates a safety rule during execution, an exception is thrown and caught by an operating system;

identifying a plurality of basic blocks of code from the intermediate result; for each of the basic blocks, determining a number of vulnerability indicators within the basic block;

generating a mapping table that maps a block identifier (ID) of each basic block to the number of vulnerability indicators associated with the basic block, wherein the mapping table is utilized to calculate the vulnerability scores;

selecting one of the seed inputs in the first set having a highest vulnerability score; and performing a concolic execution using the selected seed input as a priority, the concolic execution being performed on a second executable code generated from the intermediate result to generate a second set of seed inputs.

14. The system of claim 13, wherein the concolic executions generate the second set of seed inputs from seed inputs that caused a program flow control of the concolic execution to explore one or more branches of the source code not explored by the grey box fuzzing process.

15. The system of claim 14, wherein the operations further comprise adding the second set of seed inputs to the first set of seed inputs, such that one or more seed inputs of the second set are utilized by the grey box fuzzing process during a next iteration.

16. The system of claim 13, wherein calculating the vulnerability score for each of the seed inputs of the first set comprises:

identifying a program control flow that has been explored by the grey box fuzzing process corresponding to the seed input; and calculating the vulnerability score for the seed input based on a number of vulnerability indicators reachable by the program control flow but that have not been explored by the grey box fuzzing process.

17. The system of claim 13, wherein selecting one of the seed inputs in the first set having a highest vulnerability score comprises ordering the seed inputs of the first set based on their respective vulnerability scores to prioritize concolic executions for the first set of seed inputs.

* * * * *